April 18, 1939.    E. C. BOOTH    2,155,355
DEFROSTER
Filed March 1, 1937

INVENTOR.
EARL C. BOOTH.
BY
ATTORNEYS

Patented Apr. 18, 1939

2,155,355

UNITED STATES PATENT OFFICE 2,155,355

DEFROSTER

Earl C. Booth, Columbus, Ind., assignor to Noblitt-Sparks Industries, Inc., Columbus, Ind., a corporation of Indiana Application March 1, 1937, Serial No. 128,416

1 Claim. (Cl. 20—40.5)

My invention relates to defrosters for automobile windshields and has for its primary object the provision of an attachment which can be used in association with an automobile-body heater to collect a portion of the heated air discharged from such heater and to conduct it to and discharge it against the automobile windshield. More specifically, it is my object to produce an attachment which can quickly and readily be installed or removed and which can be used in association with a wide variety of heaters.

In carrying out my invention I provide a rigid funnel-like collector adapted to be received in the air-discharge opening of an automobile-body heater, and I provide this collector with an outlet adapted to be connected to a flexible conduit leading to a point adjacent the automobile windshield. Conveniently, the conduit terminates in a nozzle equipped with a suction cup by means of which it can be attached directly to the windshield glass. The collector is provided with releasable means for maintaining it in association with the heater.

Figure 1:
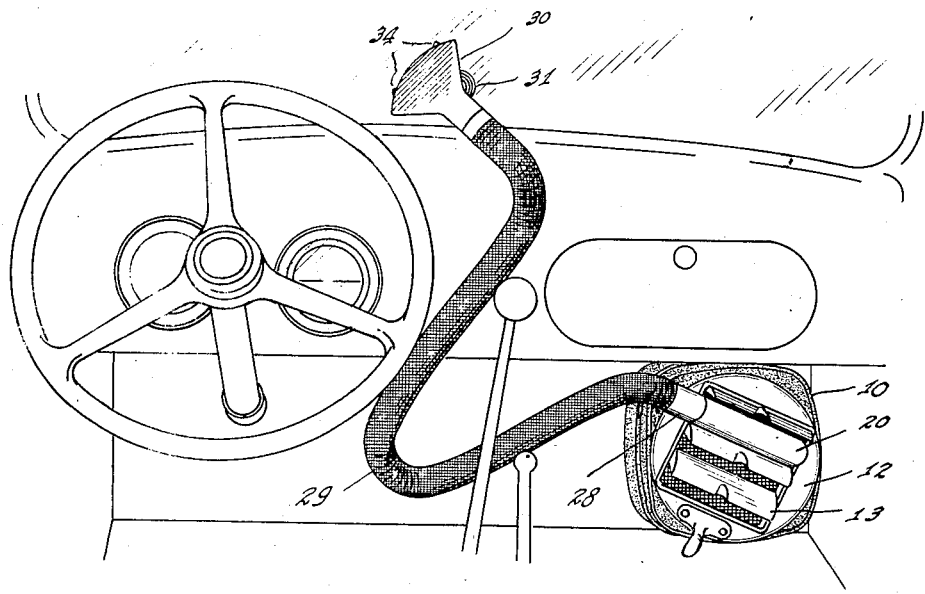
Figure 2:
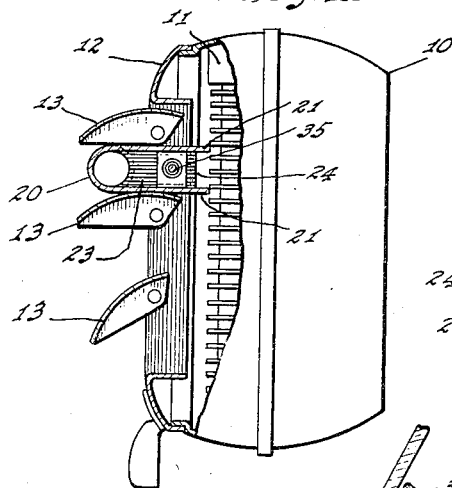
Figure 3:
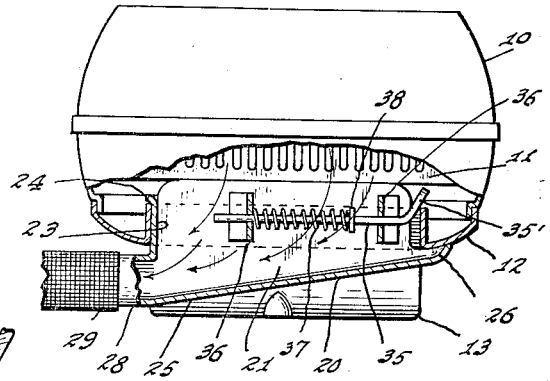
Figure 4:
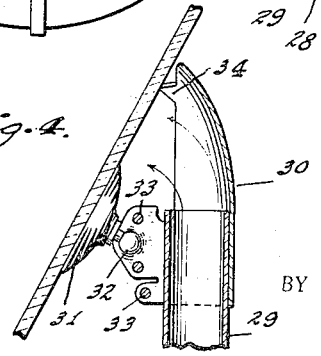

The accompanying drawing illustrates my invention: Fig. 1 is a perspective view illustrating the front end of an automobile body with my defroster attachment in place; Fig. 2 is a side elevation of the automobile-body heater with parts thereof broken away to show in section the funnel-like collector in place; Fig. 3 is a plan view of the heater, also with parts broken away to show details of construction of the collector and the means for retaining it in position; and Fig. 4 is a longitudinal section through the discharge nozzle.

The heater with which my defroster attachment is used may be almost any of the heaters now found on the market. All such heaters embody a casing 10, a core 11 through which the engine-cooling fluid is circulated, and means (not shown) for forcing air through the core and discharging it outwardly into the interior of the automobile body through an opening in the front of the casing. In the heater shown in the drawing, the casing-front 12 is rotatable relatively to the rest of the casing, and in its rectangular air-discharge opening there are mounted a plurality of pivotally adjusted shutters 13 by means of which the air discharge from the heater can be regulated in quantity and direction.

The collector 20 illustrated in the drawing is formed with parallel side walls 21 which are spaced apart at such a distance that they can be received between two adjacent shutters 13. The side walls 21 have a length somewhat less than the width of the opening in the casing-front 12; and between the side walls and one end thereof, I provide an end wall 23 formed with a lip 24 adapted to overlie the edge of the opening in the casing-front 12. At the opposite end of the collector, there need be no end wall; but instead the back wall 25 of the collector may be formed to extend outwardly beyond the adjacent end of the side walls 23 to rest against the casing-front 12 as indicated at 26 in Fig. 3.

At one end the collector 20 is formed with a nipple 28 adapted to be received in a flexible conduit 28, as shown in Fig. 3. The other end of the conduit 29 is equipped with a nozzle 30 conveniently provided with a suction-cup 31 by means of which it can be secured against the inner face of the windshield.

The nozzle 30 is conveniently formed as a flaring shell having an open face disposed adjacent the inner face of the windshield. Preferably, the suction-cup 31 is connected to the nozzle through the medium of a ball-and-socket joint 32 friction on which is imposed by clamp-bolts 33. The outer edge of the nozzle is formed with a pair of spaced ears 34 which engage the windshield. In use, the nozzle is held in position by the suction-cup 31 and the ears 34 hold the edge of the nozzle spaced from the windshield to provide an opening through which the heated air can escape.

The means illustrated in the drawing for retaining the collector 20 in position on the heater comprises a retaining member 35 mounted for sliding movement longitudinally of the collector in a pair of spaced guides 36 which extend between the opposite side walls 21. The retaining member 35 projects outwardly beyond the side walls 21 at the end opposite the end wall 23 and is there bent inwardly of the heater to provide an inclined finger 35' positioned to engage the edge of the opening in the heater-front 12. A compression spring 37, acting between one of the guides 36 and a collar 38 on the member 35, tends to force the member 35 outwardly to hold the finger 35' in engagement with the edge of the opening in the casing-front 12.

In operation, a portion of the heated air forced through the core 11 will be received in the collector 12 and conducted through the conduit 29 to the nozzle 30, from which it will be discharged against the inner face of the windshield. By adjustment of the shutters 13, the proportionate quantity of air discharged through the conduit 29 may be varied.

When it is desired to remove the defroster attachment, the collector is moved to the right in Fig. 3 to a distance sufficient to permit the lip 24 to clear the adjacent edge of the opening in the casing-front 12, whereupon the collector can be tilted and withdrawn. In installing the attachment, the outer end of the collector 12 is first inserted between two of the shutters 13 and moved to the right in Fig. 3 to bring the finger 35' into engagement with the edge of the opening in the casing-front. Continued movement of the collector to the right will compress the spring 37, thus permitting the lip 24 to be inserted through the opening in the casing-front 12. Thereafter, the spring 37 will act to hold the end wall 23 in engagement with one side of the opening in the casing-front 12 and the inclined finger 35' in engagement with the opposite edge of such opening. Because of the inclined disposition of the finger 35', it tends to move the collector inwardly of the heater to the limit of such movement, thus preventing rattling.

I claim as my invention:

In a defroster attachment for an automobile heater having a casing provided with an air-discharge opening, a rigid collector adapted to be received in the discharge opening of said heater, said collector being provided at one end with a lip for engagement with one edge of said discharge opening, a member slidable longitudinally of itself in said collector in a plane parallel to that of said opening and having an oblique portion positioned to engage the opposite edge of said discharge opening, yielding means acting between said collector and said member and biasing the latter outwardly, and a flexible conduit connected to said collector.

EARL C. BOOTH.